UNITED STATES PATENT OFFICE.

MILES WILLIAMS, OF WIGAN, ENGLAND.

IMPROVEMENT IN MANUFACTURE OF GAS.

Specification forming part of Letters Patent No. 186,028, dated January 9, 1877; application filed December 4, 1873.

*To all whom it may concern:*

Be it known that I, MILES WILLIAMS, of Wigan, in the county of Lancaster, England, have invented certain Improvements in the Manufacture of Gas, of which the following is a specification:

My invention relates to the manufacture of a superior gas for illuminating and heating purposes by simultaneously forcing steam and oleaginous substances (more particularly hydrocarbon oils) through red-hot retorts containing coke, charcoal, or other like suitable substances; and my invention consists in conducting this process in one set of retorts simultaneously with the ordinary process of distillation in another set of retorts, and in causing the two products to become intimately mixed in the hydraulic main, all as fully described hereafter.

Ordinary fire clay or iron retorts are filled, or partially filled, with coke, charcoal, or other equivalent substance, and after the whole has been brought to a red-hot condition superheated or other steam and oleaginous substances are simultaneously forced or injected into said retorts.

Various oleaginous substances may be used; but I prefer hydrocarbon oils and substances of a like nature, such as tar and its products, residues of coal-oil or petroleum, essential oils, or spirits in their natural state or in the form of vapor.

The steam and oleaginous substances are decomposed within the red-hot retorts, and rapidly converted into a permanent gas, very rich in carbureted hydrogen, and of highly illuminating power. This gas is mixed with coal or other gases, in any suitable proportions to increase their illuminating power.

The gases can be most readily and economically mixed, and the illuminating power of the mixture regulated almost at will by conducting the manufacture of the two kinds of gases simultaneously. Two sets of ordinary retorts are used, one set being required for conducting the process described above, while the other set is used for producing gas by distillation from coal or bituminous matter in the ordinary manner.

The gases resulting from both processes rise simultaneously into the same hydraulic main, where they become intimately mixed, and are purified together.

When both processes are thus conducted simultaneously, the quantity of gas produced by the distilling operation is increased, as the heavy hydrocarbons are carried off more rapidly than usual, and there will be a less production of tar. There will be also a considererable economy in the consumption of coal, as the latter need not be of the best quality, but only sufficiently good to produce a fair coke for after use in the other set of retorts in carrying out the first part of my invention.

The advantages possessed by my invention are the production of gas of high illuminating power, of great permanency, and free from sulphur and other impurities, rapidity and economy of manufacture, and the facility with which the processes can be carried out at any gas-works, as the ordinary retorts and appliances can be used with comparatively little change.

I claim as my invention—

The within-described process of manufacturing gas for illuminating and heating purposes by distilling coal or bituminous matter in one set of retorts simultaneously with the injection of steam and oleaginous matter into another set of red-hot retorts containing coke, &c., and by causing the gases thus produced to be intimately mixed within the same hydraulic main and purified together.

In witness whereof I have signed my name to this specification in the presence of two subscribing witnesses.

MILES WILLIAMS.

Witnesses:
 W. ASCROFT BYROM,
  *Solicitor, 27 King Street, Wigan.*
 THOMAS TABERNER,
  *27 King Street, Wigan, his clerk.*